United States Patent

Hazan et al.

[11] Patent Number: 5,388,501
[45] Date of Patent: Feb. 14, 1995

[54] APPLIANCE FOR INFUSING A SUBSTANCE

[75] Inventors: Jean-Pierre Hazan, Sucy; Jean-Louis Nagel, Brevannes, both of France

[73] Assignee: U.S. Phillips Corporation, New York, N.Y.

[21] Appl. No.: 170,485

[22] Filed: Dec. 20, 1993

[30] Foreign Application Priority Data

Dec. 22, 1992 [FR] France .................. 92 15503

[51] Int. Cl.6 ............................. A47J 31/40
[52] U.S. Cl. ......................... 99/285; 99/299; 99/307
[58] Field of Search .............. 99/280, 283, 285, 300, 99/306, 307, 305, 304, 299; 426/433

[56] References Cited

U.S. PATENT DOCUMENTS

| | | | |
|---|---|---|---|
| 4,548,129 | 10/1985 | Pastoor | 99/281 |
| 4,644,571 | 2/1987 | Narita | 99/280 |
| 5,044,261 | 9/1991 | Kawazoe | 99/280 |
| 5,111,969 | 5/1992 | Knepler | 99/280 |
| 5,158,793 | 10/1992 | Helbling | 99/283 |

FOREIGN PATENT DOCUMENTS 3909626 10/1990 Germany .

Primary Examiner—Robert W. Jenkins
Attorney, Agent, or Firm—Ernestine C. Bartlett

[57] ABSTRACT

An appliance for infusing a substance, for example coffee, comprises means (23, 16) for dividing an initial quantity of water into a pre-wetting quantity and at least one additional quantity, which quantities are poured on in at least two steps which are spaced in time. Means (20a, 20b, 22) for continuously measuring the level of the water to be poured on enable several dividing programs to be selected.

10 Claims, 2 Drawing Sheets

1

APPLIANCE FOR INFUSING A SUBSTANCE

FIELD OF THE INVENTION

The invention relates to an appliance for infusing a substance, which appliance comprises:
a reservoir for holding a quantity of a liquid,
means for indicating the quantity of liquid,
means for heating the quantity of liquid,
filter means for receiving the substance and the quantity of liquid,
means for dividing the quantity of liquid into a pre-wetting quantity and at least one additional quantity, which quantities are poured onto the substance in at least two respective steps which are spaced-apart in time. This may concern, for example, the infusion of tea, coffee, herbs or the like.

BACKGROUND OF THE INVENTION

It is well-known that infusion is effected by subjecting the substance to be infused, for example coffee, to the action of a hot liquid (generally water, sometimes milk) to extract the soluble constituents of the substance, the mixture of water/soluble constituents being collected in a receptacle.

For coffee it is common practice to pour on the hot water in one pass. However, for several reasons this is not an optimum method, i.e. particularly at the beginning the coffee particles are not wetted, swollen and heated adequately and the water passes through too rapidly without proper infusion of the coffee. To improve the efficiency and the quality of extraction of soluble constituents it has been proposed to pour on the hot water in a plurality of steps. This is described in the document DE-A-39 09 626. For this the water to be infused is divided into a pre-wetting quantity, poured on in a first step, and additional quantities, poured on subsequently. Pre-wetting is followed by a waiting time in which the coffee is allowed to swell under the influence of the poured-on hot water. After this, the rest of the water is poured on in one or more further steps.

For this, said document proposes to effect these operations by defining time intervals in which infusion of the coffee with hot water is either allowed or inhibited. This is achieved by influencing the time of heating of the water contained in the reservoir. However, the user will not always use the same quantities of water, which may give rise to some practical problems, for which said document does not provide a solution. In particular, the optimum pre-wetting quantity of water for a small number of cups may differ substantially from that for a large number of cups. No means are revealed to adapt the pre-wetting quantity of water to the quantity of coffee or to the quantity of water put into the coffee-maker.

SUMMARY OF THE INVENTION

It is an object of the invention to improve the brewing process.

This object is achieved with an appliance which comprises:
means for continuously measuring quantities of liquid in the reservoir, for defining said pre-wetting quantity and at least said additional quantity by dividing the liquid in dependence on the quantity of liquid initially present in the reservoir, and for influencing the dividing means in dependence on measured quantities of liquid.

Thus, the appliance selects a liquid dividing program to be performed by measuring the level of the liquid contained in the reservoir. In this way, the user need not indicate the required number of cups by means of a knob or slider and no selector for the number of cups is needed.

Current practice is that the user merely pours the water into the reservoir until the visible liquid level corresponds to the desired number of cups and subsequently puts in a quantity of ground coffee corresponding to the quantity of water. By measuring said level with the aid of a suitable transducer the appliance is capable of determining the quantity of water, i.e. the number of standard cups desired by the user. It is then merely required to turn on the appliance, which automatically selects the appropriate program for this quantity of water. There may be provided a selector to allow the user to indicate his preference for stronger or weaker coffee, as a result of which different programmes are selected for dividing the quantity of water poured in.

The means for measuring said quantities of liquid perform capacitive measurements with the aid of two metal plates forming electrodes immersed in the liquid, at least one of said plates being covered with an insulating dielectric. Alternatively, the means for measuring the quantities of liquid effect capacitive measurements with the aid of two plates disposed vertically on the outside on walls of the reservoir. Said means may also comprise a pressostat which acts on a strain gauge or a silicon pressure transducer. These and further aspects of the invention will become apparent from and be elucidated by means of the following description of embodiments.

BRIEF DESCRIPTION OF THE DRAWINGS

The invention will be more fully understood with the aid of the following Figures, given by way of non-limitative examples, in which.

DESCRIPTION OF EMBODIMENTS

Figure 1:
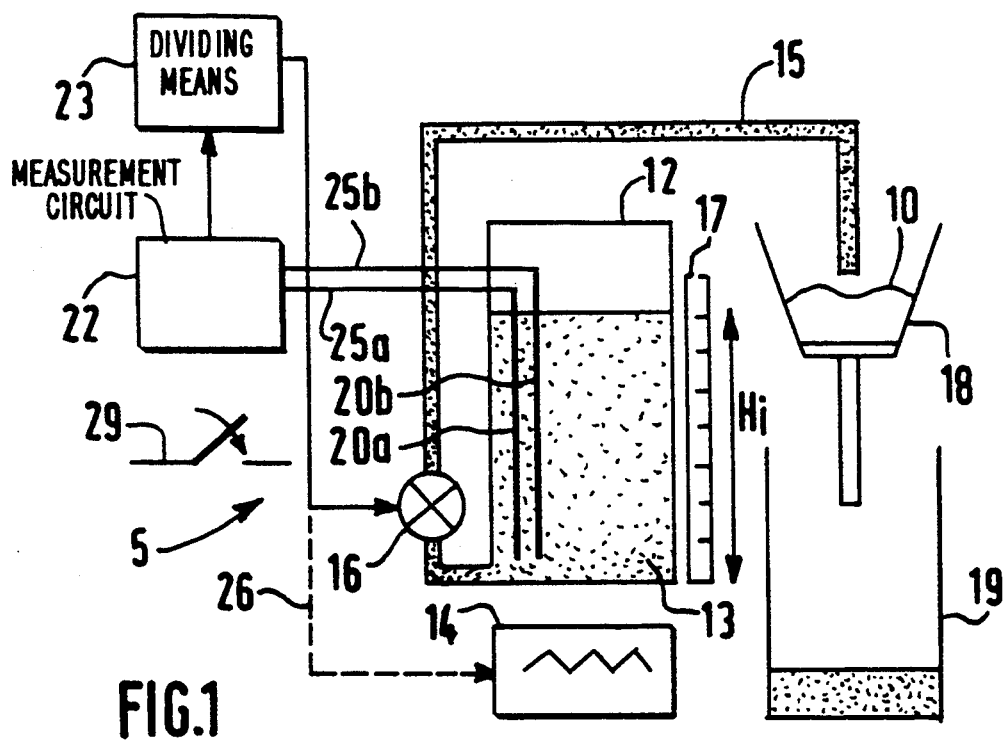
FIG. 1 is a diagram of an appliance in accordance with the invention with capacitive measurement of the quantity of liquid.

FIG. 1 shows an appliance 5 for infusing a substance 10. It comprises a reservoir 12 containing a liquid 13 heated by a resistive heater 14. An indicator 17 serves to indicate the level of the liquid in the reservoir. The liquid in the form of water/steam is conveyed to the substance 10 by a pump 16 via a duct 15. Filter means 18, which hold the substance 10, receive the liquid. After passage through the substance the mixture of liquid/soluble constituents is collected in a receptacle 19.

The liquid level is determined by measurement means comprising a measurement circuit 22 coupled to, for example, two insulated electrodes 20a, 20b immersed in the liquid and forming a capacitance. Depending on the level of the liquid in the reservoir 13 the measurement means 22, 20a, 20b influence the dividing means 23. The appliance need not have a mechanical pump 16, in which case the liquid is provided by a thermal pump of a known type. Since this pump is activated by the heater 14 of the liquid the measurement means 22, 20a, 20b activate the heater 14 (connection 26).

To start the process the user puts a certain quantity of the substance 10 into the filter means 18 and pours the quantity of liquid corresponding to the desired number of cups into the reservoir 12. As from this instant the process is transparent to the user. First of all, the initial level Hi of the liquid is determined by the means 22, 20a, 20b. In the dividing means 23 each initial level Hi (i.e. each initial quantity Qi) is associated with a program for dividing the initial quantity Qi of liquid as regards quantities of liquid and as regards the length of the waiting periods. The dividing program is stored, for example, in a memory included in the dividing means 23, which include, for example, a microprocessor.

This dividing program consists in allocating to the level Hi a pre-wetting quantity Qp which is poured onto the substance, observing a waiting time, and finally pouring out one or more additional quantities Qa until all the water contained in the reservoir has been discharged.

In the case of a plurality of additional quantities a waiting time between the various discharges is observed.

Thus, the program for an initial quantity Qi (level Hi) may be as follows:

pre-wetting quantity Qp, determined by the measurement of a level Hp,
waiting time Ta,
1st additional quantity Qa1, determined by the measurement of a level Ha1,
waiting time Ta1,
2nd additional quantity Qa2=Qi−(Qp+Qa1), determined by the measurement of a zero level.

For each initial quantity Qi a program stored in a memory contains the parameters Hp, Ta, Ha1, Ta1. As the program proceeds the circulating pump or heating means (heat pump) is activated accordingly.

The above parameters may depend on the type of appliance. They are laid down by the manufacturer of the appliance. Different programs may be envisaged for different countries depending on the local taste and practice (coffee grinds or the like).

The measurement of levels with a satisfactory resolution can be effected in various ways, for example by a capacitance measurement (FIGS. 1, 2) or by a measurement ;of the pressure in an enclosed space (FIGS. 3, 4) in which the variation of the water level causes a variation of the air volume and hence a pressure variation. This pressure variation can be measured by means of a pressure transducer comprising, for example, a silicon transducer or a strain gauge loaded by the diaphragm of a pressostat element.

For measuring the water level by a capacitance measurement (FIG. 1) it may be envisaged, in view of the high dielectric constant of water, to measure the capacitance of a liquid by immersing two bare metal electrodes in this liquid. However, this method requires many precautions. As a matter of fact, the drinking water used for making coffee contains ions ($Ca^{++}$, $Mg^{++}$, $Na^+$) so that it has an appreciable conductivity even if its degree of hardness is low. Thus, said capacitance is in parallel with a substantial leakage resistance, which is detrimental to the capacitance measurement. Moreover, when this method is used it necessary to ensure that the user cannot touch any live part.

Conversely, if the electrodes, as is preferred, are covered with a watertight dielectric the water will behave as a kind of intermediate electrode or as a short-circuit between two capacitances formed by the two electrodes.

The resulting capacitance measured is then basically a simple function of the area of the covered and wetted electrode, the thicknesses of the covering dielectrics and their dielectric constants.

Figure 2:
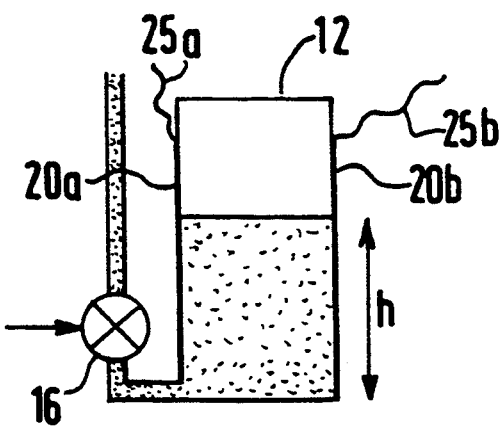
FIG. 2 is a diagram of another method of capacitively measuring the quantity of liquid.

In FIG. 1 the level of the liquid is measured capacitively by means of two electrodes immersed in the liquid. The operating principle remains the same with two electrodes 20a, 20b disposed outside the reservoir 12 (FIG. 2). The following explanations apply to the two cases. In the case of FIG. 2 the wall of the reservoir 12 should be insulating to form the dielectric of a capacitance C1 formed by the electrode 20b and the water in the reservoir. Likewise, the electrode 20a, the wall and the water form a capacitance C2. The two capacitances C1 and C2 are disposed in series via the water separating the two walls. The resulting capacitance C can be measured between the terminals 25a, 25b. It is possible to measure only one capacitance C1 or C2 by using the water as the second electrode of the capacitance to be measured. It is desirable to take precautions for the insulation of this electrode with respect to the user.

For the part which projects from the liquid surface the value of a capacitance formed by the electrode 20a, the wall, the air, the wall and the electrode 20b is negligible. It is evident that from the measurement of the resulting capacitance C the level h and hence the quantity of liquid in the reservoir can be derived.

An electrode can be formed, for example, by a metal (aluminum) plate sandwiched between two watertight polymer sheets sealed along their entire immersible circumference to allow them to be immersed in the water. The polymer sheets (for example polyethylene, polyester, polyimide or the like) are in intimate contact with the metal without an air gap. This can be achieved by sealing, for example heat-sealing, pack-rolling or the like. The polymer-coated electrode can be glued to the inner wall of the reservoir by means of a water-proof adhesive. When two electrodes are used in order to increase the overall capacitance these electrodes may be glued to the same wall.

Figure 5:
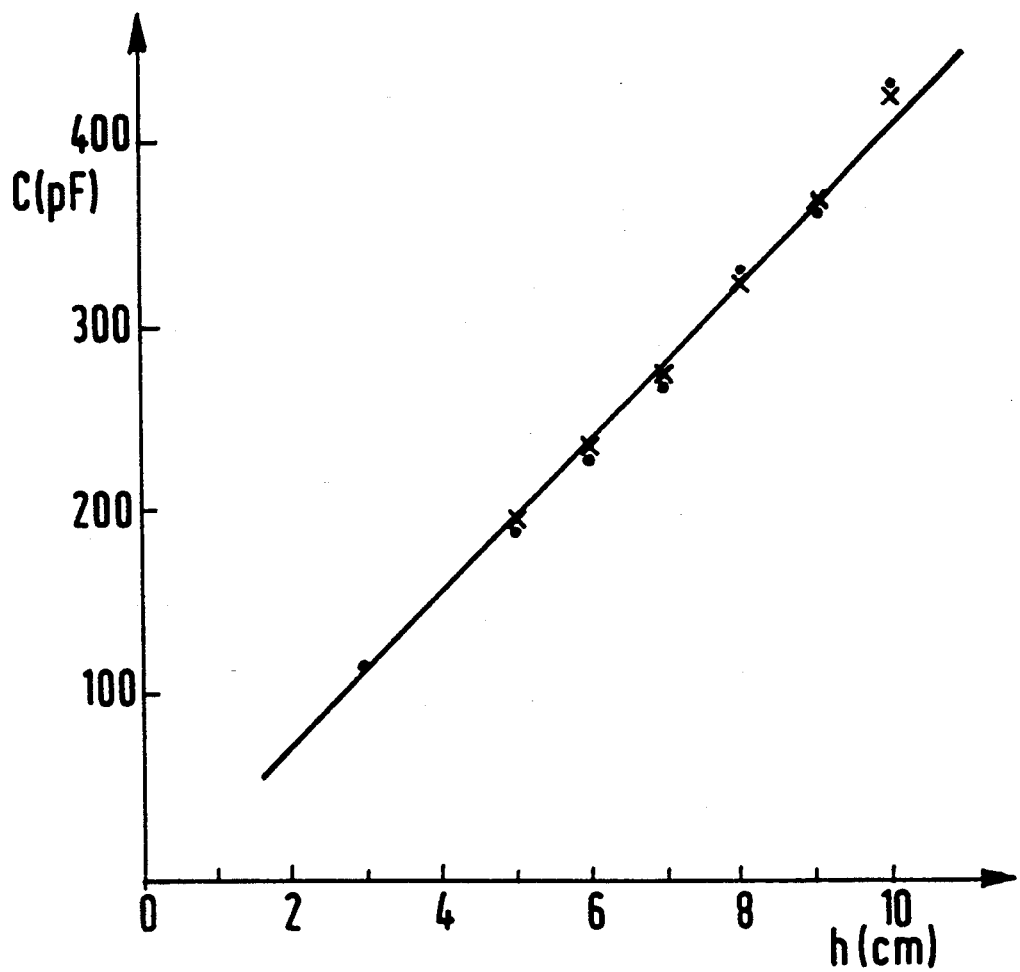
FIG. 5 is a curve representing measurements of the capacitance as a function of the liquid level.

Various tests carded out with two metal plates covered with a polymer film of 25 to 75 micrometers thickness immersed in drinking water have shown that the value of the resulting capacitance is substantially independent of the spacing between the two electrodes above one centimeter. Moreover, as is shown by the curve in FIG. 5, which represents measurements carried out by means of two aluminum plates covered with polyimide film of approximately 70 $\mu$m thickness and immersed in water, the measurement sensitivity as well as the linearity are good. For a water level varying from 2 to 10 cm, corresponding to a number of 2 to 10 cups in the present case, the measured overall capacitance varies from approximately 80 to 420 pF. Furthermore, there is a very small difference between comparatively soft water (measurements represented by crosses in FIG. 5) and much harder water (measurements represented by dots in FIG. 5).

In the case that the two electrodes are immersed in the liquid (FIG. 1) it is necessary, as described above, to seal them individually with a thin dielectric foil or film to form the capacitances C1 and C2. If both surfaces of the electrodes are immersed in the liquid each electrode will have a "front" capacitance and a "rear" capacitance, which capacitances are connected in parallel and increase the overall capacitance and hence the measurement sensitivity. Moreover, if the appliance, as is often the case with "electronic" coffee-makers, comprises a system for mains isolation (for example a small transformer) the dielectric film can be very thin: 0.1 mm or even some tens of micrometers. The overall capacitance is then substantially higher and the measurement more sensitive than for external electrodes arranged on a generally thick wall (some mm). In the last-mentioned case it is advantageous to arrange the electrodes on a thinner wall portion. In the absence of a transformer the safety standards can be met by pack-rolling a plurality of film thicknesses (for example 3 thicknesses: 1 thickness for insulation and 2 further thicknesses for the safety standards). The overall thickness remains small (between 0.1 and 0.2 mm).

If the electrode is formed by a length of a long flexible metal strip packrolled with polymer films the two ends of the electrode can be kept out of the water by placing the strip in U-shaped form in the water receptacle. As a result, it is no longer necessary to seal one of the ends by means of an additional film for each electrode. The other electrode of the capacitance to be measured is formed by the water itself.

It is also possible to use two insulated U-shaped electrodes immersed in the liquid with their ends out of the water. The two electrodes thus form the electrodes of the capacitances described above.

The measurement of the resulting capacitance by the measurement means 22 can be effected easily by arranging the capacitance in an RC circuit whose time constant is measured, for example, by measuring its discharge voltage at regular intervals, or by arranging the capacitance in an oscillator circuit whose oscillation frequency is measured.

Figure 3:
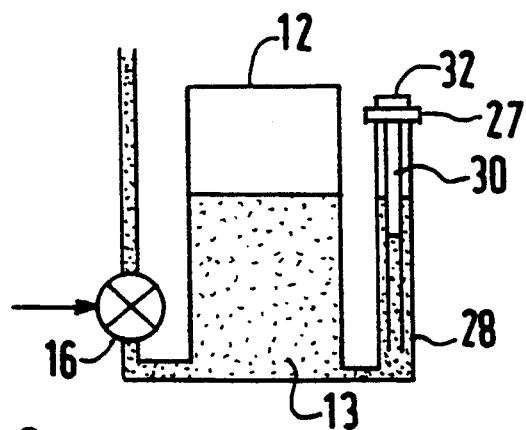
FIG. 3 is a diagram of a method of measuring the quantity of liquid by means of a pressostat.

For the measurement of the liquid level it is also possible to use a pressostat element 27 connected to the liquid reservoir by a duct 28 branching from the lower pan of the reservoir (FIG. 3). The pressure of the gas trapped in the space 30 influences the pressostat 27, whose diaphragm acts on, for example, a strain-gauge element 32, which supplies a measurement signal depending on the liquid pressure and hence on the liquid level.

Alternatively, the arrangement comprising the pressostat element 27 and strain gauge 32 may be replaced by, for example, a silicon pressure transducer which is mounted on the space 30 in a hermetically sealed manner.

Figure 4:
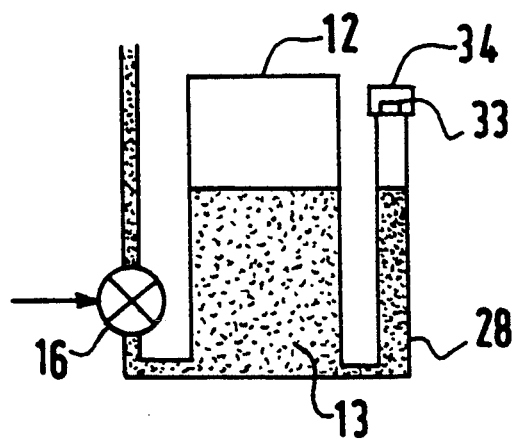
FIG. 4 is a diagram of a method of measuring the quantity of liquid by means of a silicon pressure transducer.

It is also possible to arrange a silicon pressure transducer 33 in a member 34 which hermetically seals the duct 28, as is shown in FIG. 4. The space 30 may then be dispensed with.

Other level detectors may be used within the scope of the invention.

It is possible to provide the appliance with a selector 29 (FIG. 1) to be set by the user to indicate his preference as regards the concentration of the resulting liquid brew. Thus, with the same initial liquid level Hi several sets of programs may be activated (i.e. different divisions of the liquid) depending on the selector position chosen by the user. The selected program enables the coffee brew to be optimized. If the user wishes a stronger or weaker brew he uses a larger or smaller quantity of ground coffee for an equal number of cups. The invention enables the quantity of ground coffee to be reduced and thus to be saved without a loss of quality of the coffee brew. By means of the selector the user can indicate that he has used a larger or smaller amount of ground coffee to obtain a stronger or weaker brew, which results in the appropriate program being selected by the appliance. Besides, the selector will only change the water dividing programs significantly when the quantity of water added by the user (i.e. the desired number of cups) is close to the permissible maximum or minimum. As a matter of fact, when the ratios between the quantity of water and the quantity of ground coffee are changed in order to obtain an optimum result, the water must be divided differently, i.e. the quantity of pre-wetting water and the waiting time must be changed.

The selector, which is very useful, will present hardly any inconvenience to a single user. Since the strength of the coffee desired by this user will hardly change the selector will generally remain in a given position unless it is to be adapted to the wishes of others.

We claim:

1. An appliance (5) for infusing a substance (10), which appliance comprises:
   a reservoir (12) for holding a quantity of a liquid (13),
   means (17) for indicating the quantity of liquid,
   means (14) for heating the quantity of liquid,
   filter means (18) for receiving the substance and the quantity of liquid,
   means (23, 16) for dividing the quantity of liquid into a pre-wetting quantity and at least one additional quantity, which quantities are poured onto the substance in at least two respective steps which are spaced-apart in time,
   and
   means (20a, 20b, 22) (27, 28, 32) (28, 33, 34) for continuously measuring quantities of liquid in the reservoir, for defining said prewetting quantity and at least said additional quantity by dividing the liquid in dependence on the quantity of liquid initially present in the reservoir, and for influencing the dividing means in dependence on measured quantities of liquid.

2. An appliance as claimed in claim 1, wherein the means for measuring said quantities of liquid perform capacitive measurements with the aid of at least one plate electrode (20a, 20b) immersed in the liquid.

3. An appliance as claimed in claim 2, wherein at least one of the electrodes is covered with an impervious dielectric.

4. An appliance as claimed in claim 3 which comprises a selector (29) which enables a plurality of dividing programs to be selected for a single initial quantity of liquid.

5. An appliance as claimed in claim 2 which comprises a selector (29) which enables a plurality of dividing programs to be selected for a single initial quantity of liquid.

6. An appliance as claimed in claim 1, wherein the means for measuring the quantities of liquid perform capacitive measurements with the aid of at least one plate (20a, 20b) disposed vertically on the outside on a wall of the reservoir (12).

7. An appliance as claimed in claim 6 which comprises a selector (29) which enables a plurality of dividing programs to be selected for a single initial quantity of liquid.

8. An appliance as claimed in claim 1, wherein the means for measuring said quantifies of liquid comprise a pressure transducer (27, 32) (33, 34).

9. An appliance as claimed in claim 8 which comprises a selector (29) which enables a plurality of dividing programs to be selected for a single initial quantity of liquid.

10. An appliance as claimed in claim 1 which comprises a selector (29) which enables a plurality of dividing programs to be selected for a single initial quantity of liquid.

* * * * *